US012669988B2

(12) United States Patent
Nanjundaswamy et al.

(10) Patent No.: US 12,669,988 B2
(45) Date of Patent: Jun. 30, 2026

(54) SYSTEMS AND METHODS FOR UPDATING INFORMATION HANDLING SYSTEMS AT A REMOTE NETWORK LOCATION FROM THE UPDATE REPOSITORY

(71) Applicant: DELL PRODUCTS L.P., Round Rock, TX (US)

(72) Inventors: Ravishankar Kanakapura Nanjundaswamy, Bangalore (IN); Suman Lal Banik, Bangalore (IN); Sandeep Venkatesh Pai, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 82 days.

(21) Appl. No.: 18/087,826

(22) Filed: Dec. 23, 2022

(65) Prior Publication Data

US 2024/0211233 A1 Jun. 27, 2024

(51) Int. Cl.
*G06F 8/65* (2018.01)

(52) U.S. Cl.
CPC ...................................... *G06F 8/65* (2013.01)

(58) Field of Classification Search
CPC ...................................... G06F 8/65; G06F 8/71
See application file for complete search history.

(56) References Cited

U.S. PATENT DOCUMENTS

| | | | | |
|---|---|---|---|---|
| 11,487,528 B1 * | 11/2022 | Spiegelman | .............. | G06F 8/71 |
| 2006/0294413 A1 * | 12/2006 | Filz | ........................... | G06F 8/65 |
| | | | | 714/4.4 |
| 2014/0096121 A1 * | 4/2014 | Joshi | ........................ | G06F 8/65 |
| | | | | 717/170 |
| 2014/0282475 A1 * | 9/2014 | Bagal | ........................ | G06F 8/65 |
| | | | | 717/171 |
| 2020/0073656 A1 * | 3/2020 | Satapathy | ................. | G06F 8/71 |
| 2020/0120458 A1 * | 4/2020 | Aldana | ................. | H04W 28/16 |
| 2021/0109735 A1 * | 4/2021 | Ali | ........................... | G06F 8/65 |
| 2023/0185559 A1 * | 6/2023 | Landman | .................. | G06F 8/71 |
| | | | | 717/171 |
| 2024/0103827 A1 * | 3/2024 | Bisa | ........................ | G06F 8/65 |

OTHER PUBLICATIONS

Dell EMC OpenManage Enterprise 3.9, User's Guide, DELL Technologies, Sep. 2022. (204ps).

* cited by examiner

*Primary Examiner* — Wei Y Mui
*Assistant Examiner* — Brahim Bourzik
(74) *Attorney, Agent, or Firm* — BAUGH LAW, LLC

(57) ABSTRACT

For information handling systems at the edge of a network, updates must traverse an extensive network pathway from an update catalog to the information handling systems. Traversing a long network pathway involves handling by numerous devices. Each device that handles the updates along the pathway results in consumption of resources (e.g., processing resources, memory, power, time, etc.)—the more devices that handle the updates, the more overall resource cost for processing the updates. Thus, improving how updates are handled, particularly at edges of networks, yield significant savings. Presented herein are new and more efficient systems and methods that coordinate updates to information handling systems at remote locations.

20 Claims, 8 Drawing Sheets

<u>200</u>

400

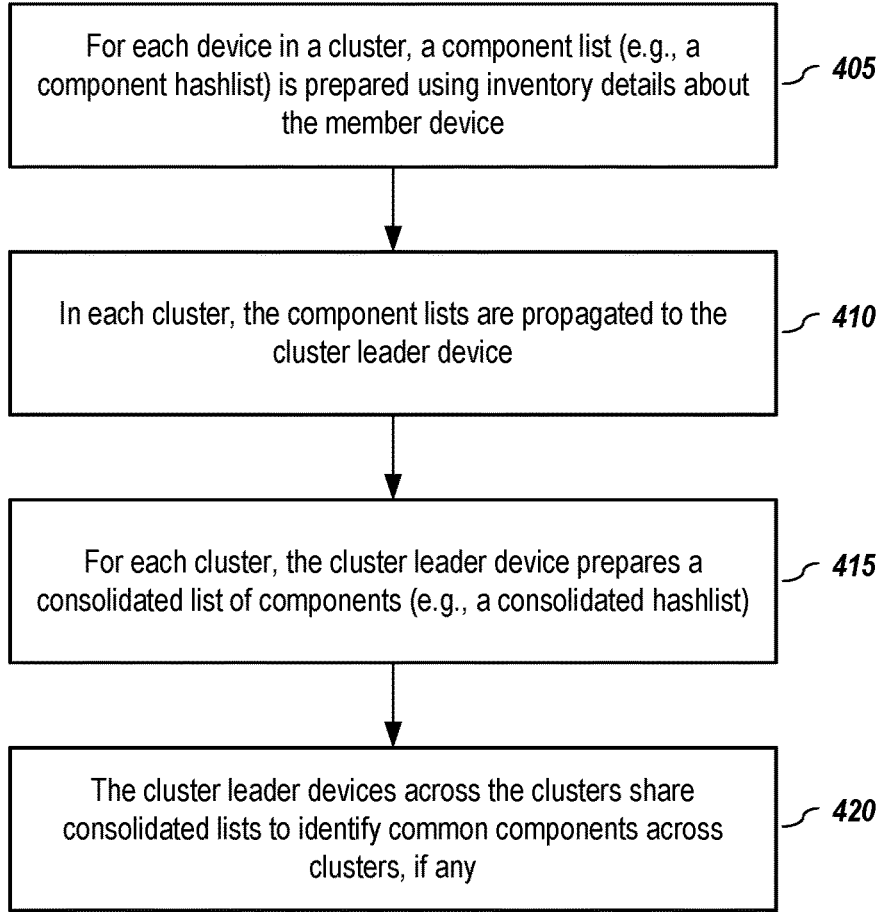

For each device in a cluster, a component list (e.g., a component hashlist) is prepared using inventory details about the member device ── 405

In each cluster, the component lists are propagated to the cluster leader device ── 410

For each cluster, the cluster leader device prepares a consolidated list of components (e.g., a consolidated hashlist) ── 415

The cluster leader devices across the clusters share consolidated lists to identify common components across clusters, if any ── 420

Table 1: Example Device Details Table

| Platform | Device ID/ System ID | Ex. |
|----------|----------|-----|
| R640 | 0716 | <Model systemID="0716" |
| R430 | 0639 | |
| ... | ... | ... |
| ... | ... | </Model> |

_505_

Table 2: Example Components Details Table

| Component | Component ID | Ex. |
|-----------|--------------|-----|
| Firmware 1 | 106803 | <Device componentID="105547" |
| Firmware 2 | 106804 | |
| ... | ... | ... |
| ... | ... | </Device> |

_510_

Table 3: Example Operation System (OS) Details Table

| OS Code | OS Version | Ex. |
|---------|-----------|-----|
| W19SE (Windows Server 2019) | 1.512.G | <OperatingSystem osCode="HCIV1" |
| HCIV2 (Azure Stack HCI 21H2) | 4.69 | |
| ... | ... | ... |
| ... | ... | </OperatingSystem> |

FIG. 5

600

Cluster leader device (or another designated member of the cluster) generates a compliance report — 605

Is update required? — 610

NO

YES

If applicable, cluster leader device creates a sub-cluster of the cluster members that require update and designates a member to be responsible for obtaining an applicable update — 615

The designated member(s) pull their respective component update(s) — 620

630

Mesh Network? — 625

NO → Store update in a shared location (e.g., https share) on a device

YES

Store update in storage and share the location with the cluster leader — 635

640 — Each cluster leader shares the location with respective members that require to update the components Each member that requires the update obtains it and updates the components in its device — 645

SYSTEMS AND METHODS FOR UPDATING INFORMATION HANDLING SYSTEMS AT A REMOTE NETWORK LOCATION FROM THE UPDATE REPOSITORY

BACKGROUND

A. Technical Field

The present disclosure relates generally to information handling systems. More particularly, the present disclosure relates to efficient updating of information handling systems.

B. Background

The subject matter discussed in the background section shall not be assumed to be prior art merely as a result of its mention in this background section. Similarly, a problem mentioned in the background section or associated with the subject matter of the background section should not be assumed to have been previously recognized in the prior art. The subject matter in the background section merely represents different approaches, which in and of themselves may also be inventions.

As the value and use of information continues to increase, individuals and businesses seek additional ways to process and store information. One option available to users is information handling systems. An information handling system (which may also be referred to herein as a device) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The number of information handling systems (or devices) on the edge of networks compared to the number of cloud devices and the number of devices at the core are high and increasing. The vast number of devices at the edge of networks creates a significant load on bandwidth usage—particularly as it relates to updating the edge devices. Because of the large number of edge devices, a huge volume of update data must traverse the length of the network channels, which is significantly different as compared to updating core and cloud devices.

Accordingly, it is highly desirable to find new, more efficient ways to provide updates to one or more information handling systems, particularly information handling systems at the edge of a network.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

FIG. 4 depicts an example methodology for generating a consolidated inventory list, according to embodiments of the present disclosure.

FIG. 5 depicts examples of tables that may be used to generate a unique hash to represent an inventory for a device or devices, according to embodiments of the present disclosure.

FIG. 6 depicts a method for coordinating updates, according to embodiments of the present disclosure.

DETAILED DESCRIPTION OF EMBODIMENTS

Figure 1:
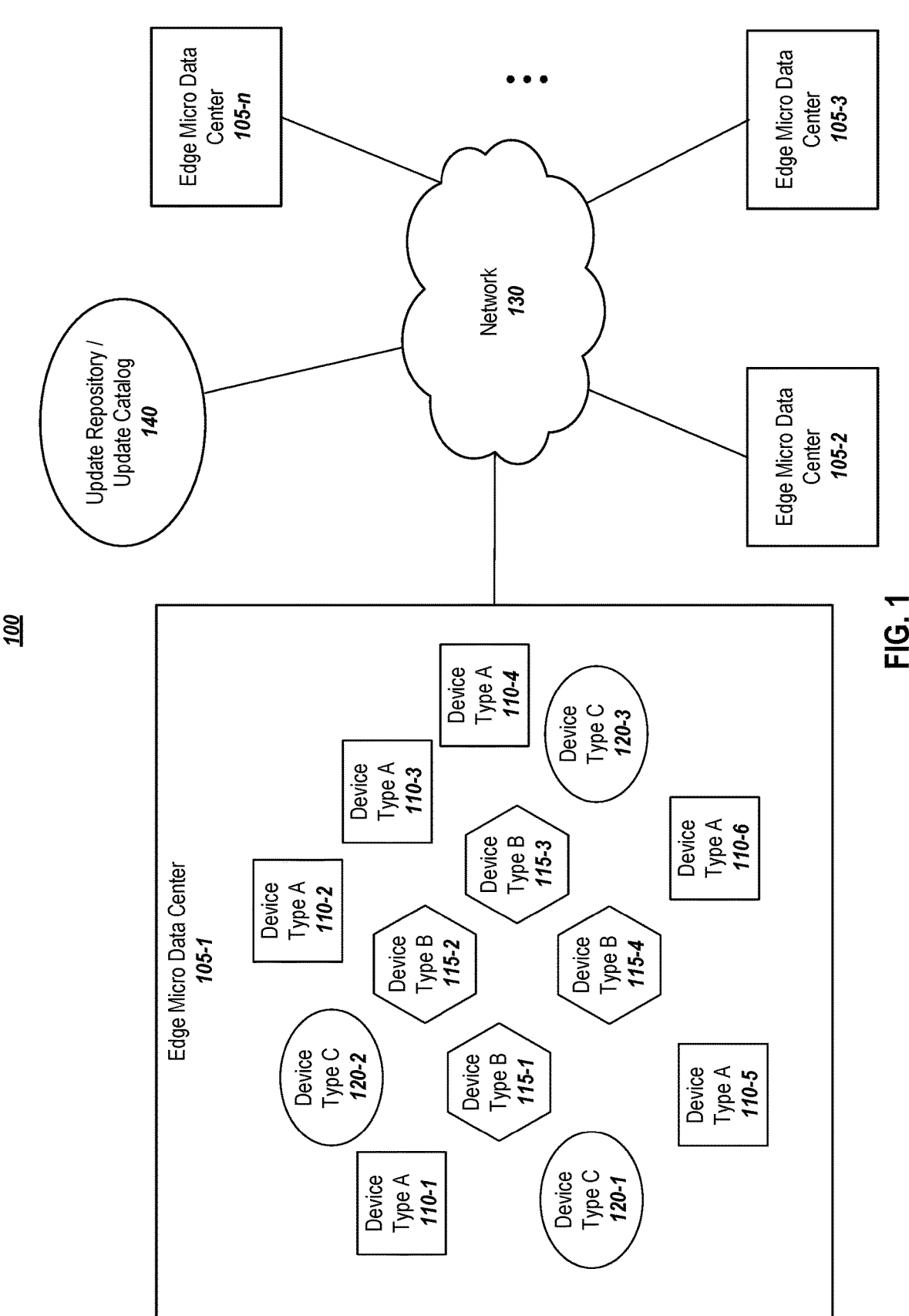
FIG. 1 graphically depicts a network that includes a plurality of edge micro data center, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," "comprising," and any of their variants shall be understood to be open terms, and any examples or lists of items are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an optimal or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall also be noted that although embodiments described herein may be within the context of edge micro data centers, aspects of the present disclosure are not so limited. Accordingly, the aspects of the present disclosure may be applied or adapted for use in other contexts.

A. General Background

Firmware or software updates on edge devices require huge amounts of data to traverse long paths across a network. Also, currently most devices individually monitor and manage their updates. This individual approach further exacerbates the load on the network because a typical edge micro data center comprises similar types and models of devices. Thus, having devices each individually download update bundles (e.g., software or firmware bundles) over the network is extremely inefficient because two or more similar neighboring devices each download the same bundle.

Currently, there are two main approaches for device and cluster (i.e., two or more devices that operate at a location) update. The first approach may be referred to as an in-band approach. Under this approach, generating compliance or updates is orchestrated by an external management console for both a device or a cluster. A catalog may be downloaded online or may be accessed through vendor-provided suites. For example, Dell, Inc. of Round Rock, Texas provides a tool—the Dell Repository Manager (DRM)—which is an application within the Dell OpenManage portfolio that allows information technology (IT) administrators to manage system updates. The DRM provides a searchable interface that may be used to create custom software collections that may be referred to as updates, bundles, or repositories of Dell Update Packages (DUPs). These bundles and repositories allow for the deployment of multiple firmware updates at once. A Dell Update Package (DUP) is typically a self-contained executable in a standard package format that updates a specific software element on an information handling system (e.g., a Dell server or storage) such as the BIOS (basic input output system), a device driver, firmware, and other similar software updates. Also, such an application may also make it easier to find and download specific updates for a particular platform. A management console, like the DRM, is typically responsible to push the vendor catalog and one or more tool sets (such as Dell's DSU (Dell Software Update), IC (Inventory Collector), etc.) to each node and to trigger the update compliance. Following generation of compliance report, which compares states of a device's components as indicated on its inventory listing (which may be complied by an IC) versus available updates, the needed updates are identified. The respective packages of these needed updates may be downloaded through management console and pushed to the nodes/devices.

The second approach may be referred as or considered as an out-of-band (OOB) approach. In a typical OOB methodology, a component of the device (such as a baseboard management controller (BMC)) manages updates as part of single device updating using an online catalog or through any offline catalog available in a network share.

In both of these cases (i.e., in-band and OOB), it should be noted that each device update happens independently. Neither of these approaches provides coordination among or between devices that require updates to improve or optimize the update workflow. Because network bandwidth is a limited resource, it is very important to reduce the management traffic over a network. Reducing the management traffic not only makes more bandwidth available for data traffic, but it also reduces the load on other network resources (e.g., power usage, computation, memory, etc.). However, since these edge devices reside remotely, it is very difficult for administrators to be manually present at these locations to coordinate operations. Accordingly, embodiments herein enable devices that belong to a same type to form a logical cluster and federate the update packages download among the nodes which form the cluster.

B. System and Method Embodiments

Presented below are embodiments of systems and methods that improve efficiency of updating components (e.g., software, hardware, and/or firmware components) of an information handling system, particularly an information handling system that is at the edge of a network (e.g., part of an edge data center). Because the information handling system is at the edge of a network, the update must traverse an extensive network pathway from an update catalog (e.g., an update datastore) to the information handling system. Traversing a long network pathway involves handling by numerous devices. Each device that handles the update along the pathway results in consumption of resources (e.g., processing resources, memory, power, time, etc.)—the more devices that handle the update, the more overall resource cost for processing the update. Thus, improving how updates are handled, particularly at edges of networks, yield significant savings.

In one or more embodiments, a new component (which may be implemented in software, firmware, hardware, or any combination thereof) may be included with an information handling system to perform the functionality described below. For example, in one or more embodiments, a new module may be included in a baseboard management controller (BMC) of an information handling system, in which the module facilitates the information handling system's participation in methods for efficient updating of components of one or more information handling systems at a remote location, such as an edge micro data center.

FIG. 1 graphically depicts a network 100 that includes a plurality of edge micro data centers 105, according to embodiments of the present disclosure. Also depict in FIG. 1 is an update repository or update catalog 140, which maintains a listing of all current updates and the corresponding bundles for updating various components of various information handling systems. Note that the edge micro data center comprises a plurality of different types of information handling systems, which are denoted by different shapes and name types. In FIG. 1, there are three types of information handling systems: Device Type A 110, Device Type B 115, and Device Type C 120. For example, Device Type A 110 may be access points or routers, Device Type B 115 may be servers, and Device Type C 120 may be switches. Note that each device type may not be exactly identical with another device of the same type. In one or more embodiments, two devices of the same type may have different components. For example, two servers may have different processors, different amounts or types of memory, different network interface cards (NICs), different graphics cards, etc.

By way of general overview, embodiments herein may comprise the following main stages:
1. Device Discovery or Device Communication;
2. Cluster Formation;
3. Consolidated Cluster Inventory Details Creation; and
4. Coordinated Component Updating.
Embodiments of each of these stages is described in more detail below.

1. Device Discovery or Device Communication Embodiments

In one or more embodiments, to facilitate efficient updating of the information handling system at a remote location (e.g., an edge data center) from the update repository, the information handling systems first need to be aware of each other. As discussed in more detail in the next section, the information handling systems (or devices) in a data center or locale communicate with one another to be aware of each other in order to form one or more clusters.

In one or more embodiments, peer-peer communication may be used and may be achieved by the devices via LLDP (Link Layer Discovery Protocol)—although it shall be noted that other communication methods and protocols may be used. Each device (e.g., devices 110, 115, and 120 in FIG. 1) may broadcast and listen to LLDP messages. In one or more embodiments, a broadcast message may comprise:
   Device Model Details (e.g., model type ID (e.g., R640— for the PowerEdge R640 Rack Server, which is sold by Dell of Round Rock Texas), chassis ID (e.g., MX7000 chassis), etc.).
   System Identifier (e.g., a unique ID for each model. For example, for a PowerEdge R640 Rack Server sold by Dell of Round Rock Texas, the system identifier may be 0716, which represents a vendor-generated unique ID).
   Inventory details (e.g., processor description, memory, graphics processing unit (GPU), hard drives, displays, NIC, bus width, firmware/software versions of components, etc.).
   Other information (in one or more embodiments, additional information may be included or broadcast).

Different parts of the information may be sent at different times and at different frequencies or intervals. For example, in one or more embodiments, the device model details, which may be used as a device identifier, may be sent or broadcast at a higher frequency than other types of information, such as the inventory details. Part of the reasoning of the higher frequency of sending device identifier messages is because, in one or more embodiments, it is beneficial for device discovery (e.g., in case a new device is added to the edge data center) and it is lightweight (i.e., includes limited information and therefore uses very little bandwidth). Whereas, the sharing of inventory lists is likely to contain much more information and is less likely to change over time; thus, it may be sent at less frequent intervals and/or when a triggering event occurs (e.g., change in a component-update has been applied, new component installed, etc.).

2. Embodiments of Cluster Formation

In one or more embodiments, based on the exchanged information, devices identify other devices within the edge micro data center that may be clustered into one or more clusters. One or more criteria and/or metrics may be used to determine membership for clustering, including but not limited to location, network configuration, and device characteristics (e.g., model, components, etc.). In one or more embodiments, "similarity" of devices may be a primary determiner for grouping devices into one or more clusters. For example, in one or more embodiments, devices may be deemed to be "similar" if they belong to the same model or may be deemed "similar" based upon one or more types of component(s) (e.g., if devices share a set of core components, if devices have meet or exceed a percentage of components in common, etc.). Have identified like devices, these like devices may be formed into a cluster.

Figure 2:
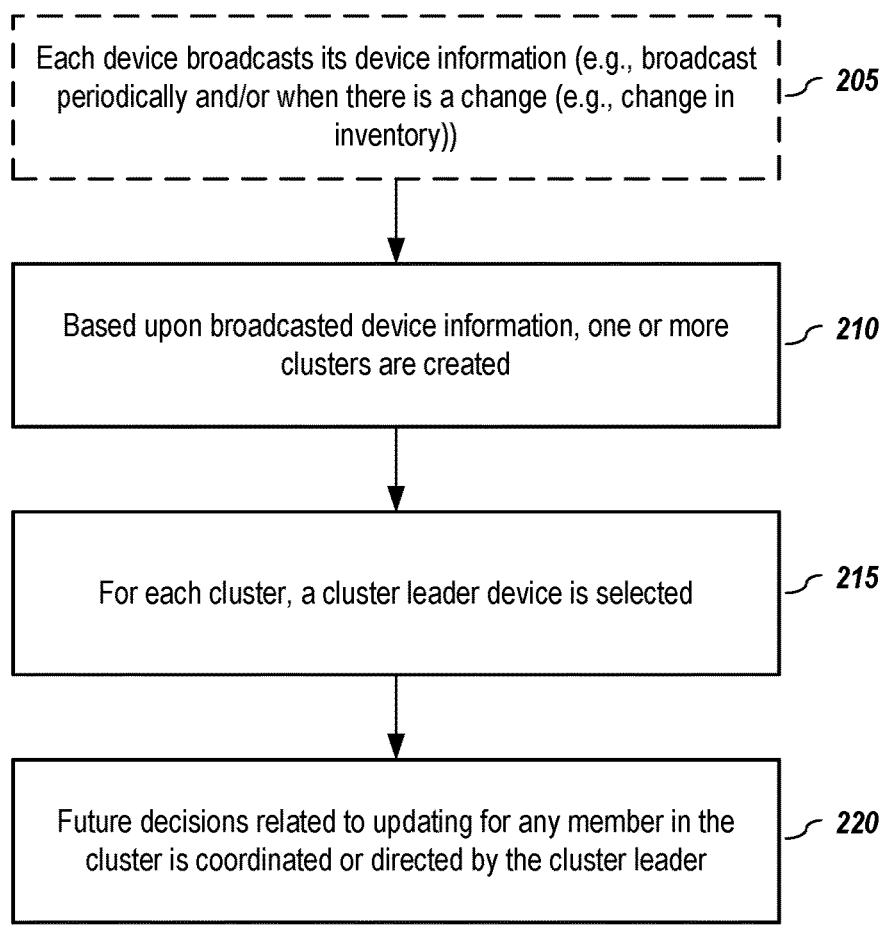
FIG. 2 depicts an example methodology for cluster formation, according to embodiments of the present disclosure.

FIG. 2 depicts an example methodology for cluster formation, according to embodiments of the present disclosure. As noted in the prior section, as a precursor step for cluster formation, each device broadcasts (205) a set of device information, which may be broadcast periodically and/or when there is a change in the network or to a device (e.g., change in inventory/component list or attribute of a component).

Based upon broadcasted device information, one or more clusters are created (210). As noted above, clustering may be based upon a listing of one or more criteria or rules that define how devices should be grouped into clusters. Alternatively, or additionally, an administrator may manually form devices into clusters or may amend/alter the device members of automatically generated clusters. In one or more embodiments, each cluster may be assigned a unique identifier, and a cluster leader device is selected (215). Selection of the cluster leader may be determined based on one or more rules or may be performed using a voting mechanism between the devices. For example, a device with the historically least amount of data traffic load may be selected as the leader, a device with the greatest computation resources may be selected as the leader, a device with the highest IP address may be selected, the first device formally added to the cluster may made the leader, a random number generator may randomly select a leader, etc. One skilled in this area will recognize that several methodologies exist for selecting a primary device, and any of those such methodologies may be employed. It should be noted that the role of cluster leader may be passed from one device to another over the course of the existence of the cluster. For example, in one or more embodiments, a cluster leader may be decided based on a cyclic rotational basis over a specific duration using any of the existing methodologies ensuring high availability. It should also be noted that one or more back-up cluster leaders may also be designated to insure high availability. Having assigned a cluster leader, in one or more embodiments, future decisions related to updating for any member in the cluster may be coordinated or directed (220) by the cluster leader device.

Given that each cluster has a cluster leader, the devices may send messages, such as inventory lists, directly to the cluster leader, thereby reducing network data traffic within the data center. In the event that direct messages are not sent or cannot be sent, in one or more embodiments, consumption of subsequent broadcasted messages may be limited to the devices belonging to the same cluster, limited to just the cluster leader, or some combination thereof depending upon the type of message or an indicator in the message.

Figure 3:
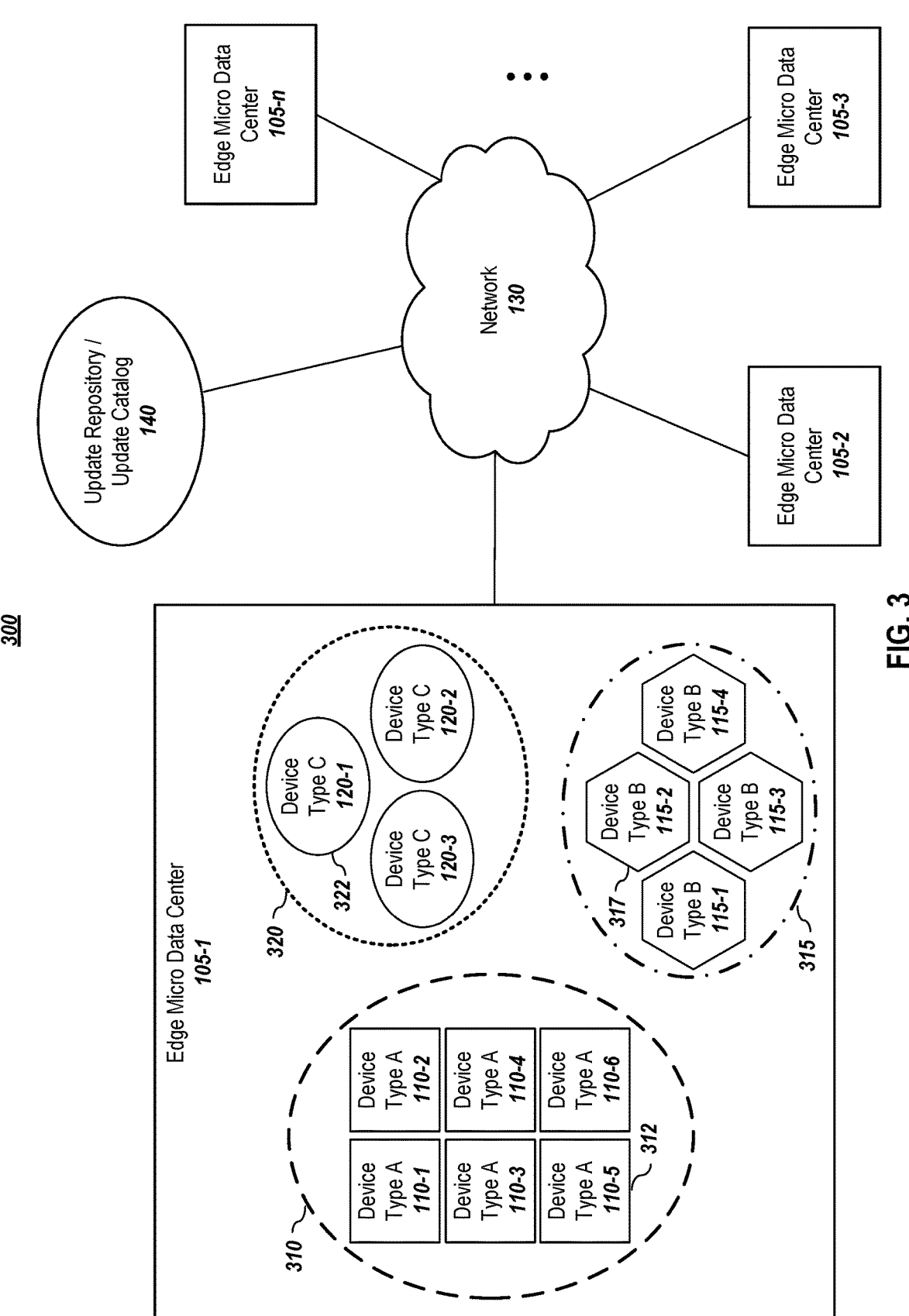
FIG. 3 graphically depicts a cluster logical topology of the edge micro data center 105-1 from FIG. 1 following cluster formation, according to embodiments of the present disclosure.

FIG. 3 graphically depicts a cluster logical topology of the edge micro data center 105-1 from FIG. 1 following cluster formation, according to embodiments of the present disclosure. Note that in this depicted example, devices have been clustered based upon type, in which:

- all devices of Type A have been formed into cluster 310 and Device 110-5 (312) was selected as the cluster leader;
- all devices of Type B have been formed into cluster 315 and Device 115-2 (317) was selected as the cluster leader; and
- all devices of Type C have been formed into cluster 320 and Device 120-1 (322) was selected as the cluster leader.

3. Embodiments of Consolidated Inventory List Creation

In one or more embodiments, the member devices of a cluster share their respective inventory details with the cluster leader device, so that a consolidated inventory data may be prepared and a compliance report generated.

FIG. 4 depicts an example methodology for generating a consolidated inventory list, according to embodiments of the present disclosure. In one or more embodiments, each member device in a cluster prepares (405) a component list comprising its inventory details. The components lists may comprise all types of specification data related to software, hardware, and/or firmware components of the member device, including but not limited to: characteristics (e.g., base model type, bus width, cache size, capacity, description, device type, device locator, error correction, speed, status, etc.), links, chassis information, firmware revision version, manufacturer, CPU, CPU affinity, subsystem information, metrics (e.g., last system inventory time, last update time, manufacture data, OEM (original equipment manufacturer), etc.), part number, serial number, rank count, status, etc.

In one or more embodiments, for each cluster, the component lists are sent (410) to the cluster leader device, and each cluster leader device prepares (415) a consolidated list of components. A consolidated list may comprise a listing that identifies common components between or among member devices in the cluster. Having the consolidated list allows a cluster leader to identify which devices within the cluster may share updates due to their common components.

In one or more embodiments, the cluster leader devices across the clusters may also share (420) their consolidated lists to identify common components across clusters, if any. Thus, in like manner as within a cluster (i.e., intra-cluster sharing of common updates), embodiments may also comprise inter-cluster sharing of common updates.

It should be noted that, depending upon the underlying communication protocol used by a cluster, there may be limitations on the size of the data that may be shared. Or, for efficiency, embodiments may want to limit the amount of network data traffic that is generated to share the inventory lists and/or the consolidated lists. For example, the LLDP protocol for communication may have certain limitations on the size of the data that can be broadcasted. Accordingly, a compressed version or a compress representation of the data may be communicated.

In one or more embodiments, to reduce the amount of data, devices may have a known base or template configuration, and then the member devices need only send their deviations or differentials from the base configuration. That is, a data center device, such as a particular model of switch, may have a base configuration. Given that known base configuration, in one or more embodiments, all the same model of switch are clustered into the same cluster, each member switch need only send its differential from the base configuration to the cluster leader.

Alternatively, or additionally, in one or more embodiments, a unique hash (e.g., a component hashlist and/or a consolidated hashlist list) may be generated and sent to the cluster leader. In one or more embodiments, a baseboard management controller (BMC) or other component of a device may generate the hash. Embodiments of a component hashlist that represents the components list of a member device may be created for the components in the following category: Compute, Memory, Storage, and Network (although it shall be noted that fewer or more categories may be used). In one or more embodiments, this hash represents the inventory details of the components in their respective category, and a cluster leader may then decipher the inventory details from the respective member hash list for each category. In one or more embodiments, the hash may be reversible or invertible so that the cluster leader can convert the hash into a components list.

In one or more embodiments, a unique hash may be created based on combination of information, such as (but not limited to): Device ID/System ID, Component ID, and OS ID for each specific category. FIG. 5 depicts examples of tables that may be created using information from the vendor catalog, which may then be used to generate a unique hash for the respective category, according to embodiments of the present disclosure. For example, in one or more embodiments, once the inventory of the device is done, a unique hash is generated for all the components in the inventory by referring to a specified table or tables, which correspond to the inventoried device model. In one or more embodiments, the hash may be generated from a consolidation or concatenation of numbers.

Table 1 (500) depicts an example device details table.

Table 2 (505) depicts an example component details table for a device.

Table 3 (510) depicts an example operating system (OS) details table for a device.

In one or more embodiments, a hash may be generated by the BMC, in which input for generating the hash comes from the component Ids in a vendor catalog.

As noted above, a cluster leader may use this information to create a custom catalog with consolidated list of the hashes, which represents the overall inventory data of all the member devices in the cluster. Also as noted above, because common components may exist across devices—for example both model R640 devices and model R740 devices may use the same network adaptor model—the cluster leaders may also exchange their consolidated inventory list across clusters to identify common components across the logical clusters. In one or more embodiments, coordination across clusters may also be part of the improvement to efficiency in downloading of components update bundle. In one or more embodiments, where common components exist across two or more clusters, the clusters' leaders may elect a second-tier leader (i.e., a meta-cluster leader). The meta-cluster leader may be elected in similar manner as the cluster leaders or may be elected based upon having the most members in its cluster that require a particular download bundle.

4. Component Update Embodiments

A next phase may comprise coordinating and effecting the updates for members in a cluster or clusters. In one or more embodiments, a micro data center may have a baseline specified by a customer or may be mapped to a vendor's online catalog, which may be used as a baseline. That is, in one or more embodiments, a vendor publishes a universal set of firmware and driver versions for all the model/components that are supported by the vendor, and a baseline may represent a set of one or more devices or group of devices that are associated with a firmware/driver catalog (or catalogs) and may be created for compliance evaluation of the components of devices (e.g., the firmware and drivers for the devices in that baseline) against the versions specified in an update catalog. In one or more embodiments, the consolidated list may be the baseline, or a baseline may be generated using the consolidated list. A cluster leader device may generate a compliance report by comparing currently available versions or updates against a baseline-thereby determining whether components of any device have updates that are available and can be applied to the component(s).

FIG. 6 depicts a method for coordinating updates, according to embodiments of the present disclosure. In one or more embodiments, a cluster leader device (or another designated member of the cluster) generates a compliance report that compares (605) existing states (e.g., current versions of firmware or software) of the components of the member devices at the cluster relative to an available updates list (or catalog). If all components are up-to-date (610), the cluster leader may return to generate a compliance report at a later time. A compliance report may be generated periodically, when a change happens (e.g., at the data center or only to that cluster), when notified that new updates are available by a vendor catalog, or a combination thereof. However, if the compliance report indicates that one or more updates are available (610), the cluster leader proceeds to having the update(s) be obtained.

In one or more embodiments, if applicable, a cluster leader device may create (615) a sub-cluster of the cluster members that require updating (i.e., the members that have a component that has not yet applied the update) and may designate a member to be responsible for obtaining an applicable update (which may comprise a bundle or set of updates). The cluster leader device may download the update on behalf of the cluster, or it may designate a member, particularly a member that requires the update, to obtain the applicable update. It should be noted that there may be a plurality of sub-clusters, in which case there may also be a plurality of designated members; although it may also be that one designated member is a member of two or more sub-clusters and may be appointed the designate member for the sub-clusters. Note also that different download updates (or update bundles) may be downloaded to account for different update needs of different devices.

Consider the following example (by way of illustration and not limitation) using FIG. 3. Assume that Device 110-1 requires updates A, M, and Y, Device 110-2 requires updates A, M, Y, and Z, Device 110-4 requires A and B, and Device 110-5 requires updates A, M, and Y, and Device 110-6 requires updates A and E. In one or more embodiments, cluster leader 110-5 may designate Device 110-2, which requires the most updates, to obtain all updates A, B, E, M, Y, and Z. Alternatively, cluster leader 110-5 may designate Device 110-2 to obtain updates A, M, Y, and Z, designate Device 110-4 to obtain update B, and designate Device 110-6 to obtain update E. It shall be noted that other designations and configurations may also be used.

The designated member or members may then obtain (620) their respective component updates from the update catalog or datastore.

In one or more embodiments, if the network at the data center is not (625) a mesh network, the designated member may store (630) the downloaded update in a shared location (e.g., an https share) on a device within the edge micro data center. The device may be the designated device, the cluster leader device, or other storage device. Each cluster leader may then share (640) the location with respective member devices that require the update, and each member that requires the update obtains it and updates (645) its component(s).

In one or more embodiments, if the network at the data center is (625) a mesh network, the designated member may store (635) the downloaded update in storage and share the location with the leader node. Similarly, each cluster leader may then share (640) the location with respective member devices that require to update the components, and each member that requires the update obtains it and updates (645) its component(s). For example, a designated device's BMC may save the update bundle in the https share location and share the information to the cluster leader device. The cluster leader device communicates the BMC IP (Internet Protocol) address and the https share location to member device or devices that require the update, which pull the component update bundle for its respective updates.

While not depicted in FIG. 6, devices that update may send updated inventory lists to their respective cluster leaders to reflect the newer versions of updates in their inventory lists. Furthermore, a cluster leader device may use the updated inventory list or lists to generate a new compliance report.

As noted above, in one or more embodiments, cluster leaders may coordinate to determine if updates may be shared between or among clusters. In situations in which an update may be shared by two or more clusters, a member of one cluster may be designated to download the update for each of the clusters. Once downloaded, the member may report the update's local location to its cluster leader, who in turn notifies the other cluster leaders, or may report the update's local location directly to each of the cluster leaders.

It should be noted that by coordinating the updating for the cluster (and in embodiments, across clusters), the amount of network data traffic and other resources used to obtain the updates as compared with the prior approaches of having every device downloading the update is significantly reduced. This reduces the amount of redundant data that otherwise would need to be pulled in over the network. Also, it can allow improvements in getting access to the updates because if all the devices simultaneously attempted to access the update catalog, it would slow the download rate for everyone. However, as discussed below, by obtaining a local copy first and then allowing other devices to access that local copy, the overall time to update all the devices is reduced. Thus, presented herein are new and more efficient systems and methods that provide updates to information handling systems, particularly information handling system at the edge of a network.

C. System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drives, solid state drive, or both), one or more network ports for communicating with external devices as well as various input and output (I/O) devices. The computing system may also include one or more buses operable to transmit communications between the various hardware components.

Figure 7:
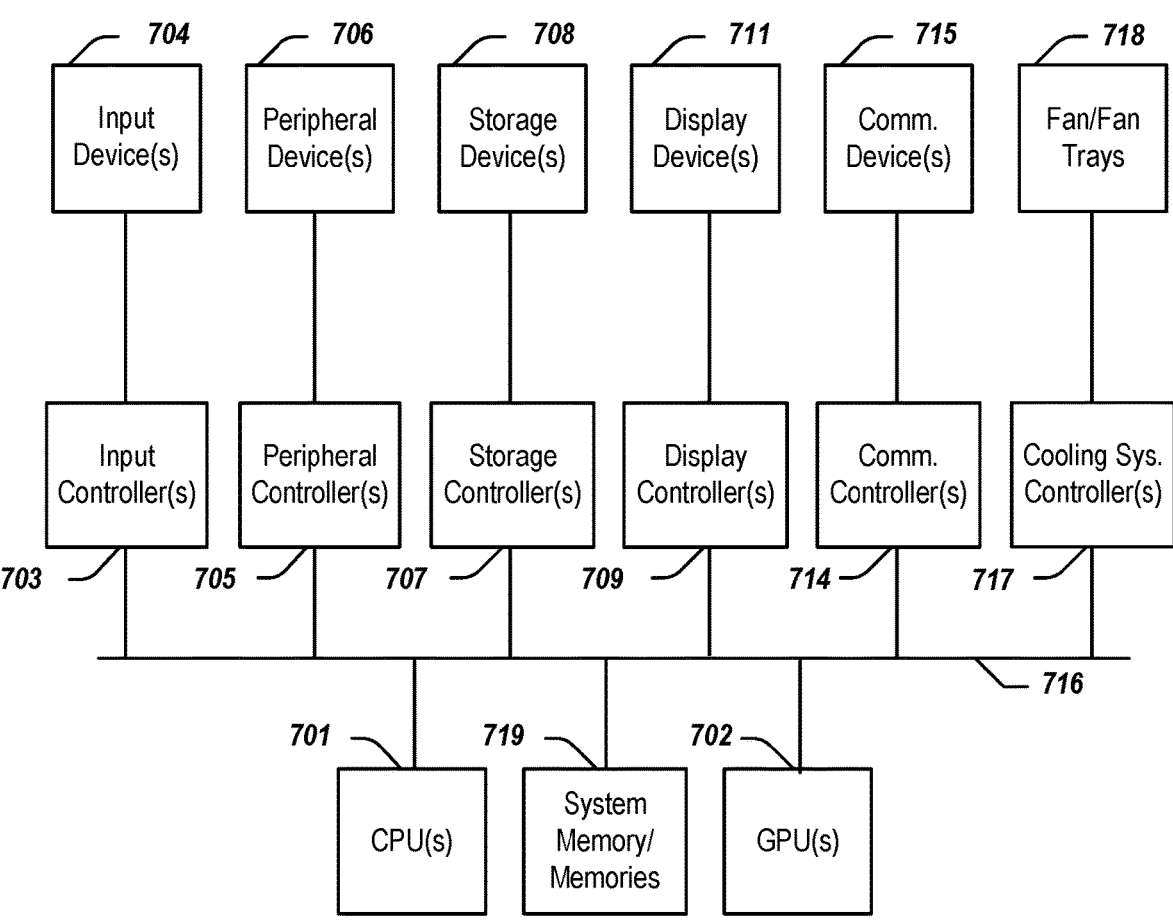
FIG. 7 depicts a simplified block diagram of an information handling system, according to embodiments of the present disclosure.

FIG. 7 depicts a simplified block diagram of an information handling system (or computing system), according to embodiments of the present disclosure. It will be understood that the functionalities shown for system 700 may operate to support various embodiments of a computing system—although it shall be understood that a computing system may be differently configured and include different components, including having fewer or more components as depicted in FIG. 7.

As illustrated in FIG. 7, the computing system 700 includes one or more CPUs 701 that provides computing resources and controls the computer. CPU 701 may be implemented with a microprocessor or the like and may also include one or more graphics processing units (GPU) 702 and/or a floating-point coprocessor for mathematical computations. In one or more embodiments, one or more GPUs 702 may be incorporated within the display controller 709, such as part of a graphics card or cards. The system 700 may also include a system memory 719, which may comprise RAM, ROM, or both.

A number of controllers and peripheral devices may also be provided, as shown in FIG. 7. An input controller 703 represents an interface to various input device(s) 704, such as a keyboard, mouse, touchscreen, stylus, microphone, camera, trackpad, display, etc. The computing system 700 may also include a storage controller 707 for interfacing with one or more storage devices 708 each of which includes a storage medium such as magnetic tape or disk, or an optical medium that might be used to record programs of instructions for operating systems, utilities, and applications, which may include embodiments of programs that implement various aspects of the present disclosure. Storage device(s) 708 may also be used to store processed data or data to be processed in accordance with the disclosure. The system 700 may also include a display controller 709 for providing an interface to a display device 711, which may be a cathode ray tube (CRT) display, a thin film transistor (TFT) display, organic light-emitting diode, electroluminescent panel, plasma panel, or any other type of display. The computing system 700 may also include one or more peripheral controllers or interfaces 705 for one or more peripherals 706. Examples of peripherals may include one or more printers, scanners, input devices, output devices, sensors, and the like. A communications controller 714 may interface with one or more communication devices 715, which enables the system 700 to connect to remote devices through any of a variety of networks including the Internet, a cloud resource (e.g., an Ethernet cloud, a Fibre Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 700 comprises one or more fans or fan trays 718 and a cooling subsystem controller or controllers 717 that monitors thermal temperature(s) of the system 700 (or components thereof) and operates the fans/fan trays 718 to help regulate the temperature.

In the illustrated system, all major system components may connect to a bus 716, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable media including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 8:
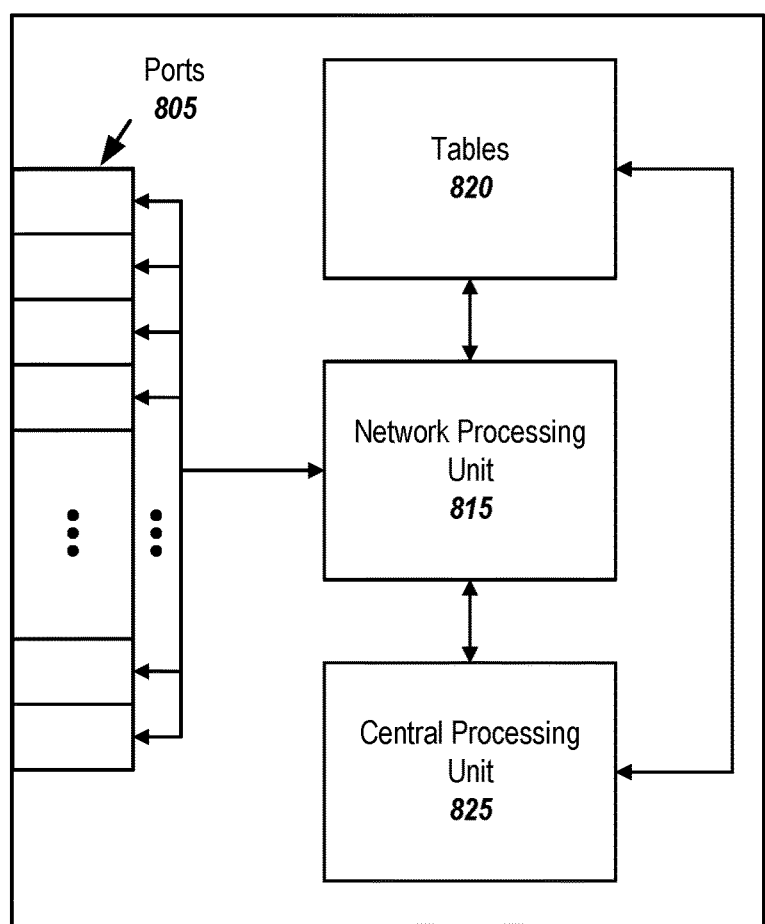
FIG. 8 depicts an alternative block diagram of an information handling system, according to embodiments of the present disclosure.

FIG. 8 depicts an alternative block diagram of an information handling system, according to embodiments of the present disclosure. It will be understood that the functionalities shown for system 800 may operate to support various embodiments of the present disclosure—although it shall be understood that such system may be differently configured and include different components, additional components, or fewer components.

The information handling system 800 may include a plurality of I/O ports 805, a network processing unit (NPU) 815, one or more tables 820, and a CPU 825. The system includes a power supply (not shown) and may also include other components, which are not shown for sake of simplicity.

In one or more embodiments, the I/O ports 805 may be connected via one or more cables to one or more other network devices or clients. The network processing unit 815 may use information included in the network data received at the node 800, as well as information stored in the tables 820, to identify a next device for the network data, among other possible activities. In one or more embodiments, a switching fabric may then schedule the network data for propagation through the node to an egress port for transmission to the next destination.

It shall be noted that the information handling system discussed herein may include a baseboard management controller (BMC) that is configured to perform the methods disclosed herein.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as compact discs (CDs) and holographic devices; magneto-optical media; and hardware devices that are specially configured to store or to store and execute program code, such as ASICs, PLDs, flash memory devices, other non-volatile memory devices (such as 3D XPoint-based devices), ROM, and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for coordinating updates at a datacenter comprising a plurality of information handling systems, the method comprising:

receiving, at a first information handling system of a datacenter, broadcasted data from one or more other information handling systems at the datacenter that comprises one or more details about the one or more other information handling systems, one or more identifiers about the one or more other information handling systems, or both, in which at least some of the broadcasted data is used to cluster information handling systems by identifying information handling systems that share one or more similarities;

joining a cluster as a member of the cluster, in which membership of the cluster is determined using at least some of the broadcasted data in which members of the cluster share one or more similarities related to one or more updates, wherein the cluster is formed based on the broadcasted data without a pre-existing cluster leader or external management controller initiating formation of the cluster, and wherein the cluster comprises the first information handling system as a member and at least one other information handling system at the datacenter as a member; and responsive to the first information handling system being designated a cluster leader for the cluster of which it is a member, wherein the first information handling system is designated as the cluster leader after the cluster is formed and from among the members of the cluster:

receiving from each of the members of the cluster an inventory list that comprises components of the member that are subject to being updated;

using the inventory lists from the members of the cluster to generate a compliance report that indicates which members have a component that has an update; and providing, or causing to be provided, a location of a downloaded update at a local datastore to the members of the cluster that have the component that has not yet applied the update, in which the update is downloaded to the local datastore by an information handling system at the datacenter that has been designated to access and download the update on behalf of the members of the cluster that have the component that has not yet applied the update.

2. The computer-implemented method of claim 1 further comprising:

designating the information handling system to access and download to the local datastore the update on behalf of the members of the cluster that have the component that has not yet applied the update.

3. The computer-implemented method of claim 1 wherein:

responsive to the cluster not being in a mesh network topology, causing the designated information handling system to store the update in the local datastore that is a shared location, which is accessible by at least the members of the cluster that have the component that has not yet applied the update; and responsive to the cluster being in a mesh network topology, causing the designated information handling system to store the update in the local datastore that is a memory location on a member of the cluster.

4. The computer-implemented method of claim 1 further comprising:

broadcasting, from the first information handling system at the datacenter to one or more other information handling systems at the datacenter, data about the first information handling system comprising one or more details, one or more identifiers, or both about the first information handling system, in which at least some of the data is used to help form the cluster by identifying one or more other information handling systems that share one or more similarities related to updating with the first information handling system.

5. The computer-implemented method of claim 1 wherein the datacenter is an edge datacenter.

6. The computer-implemented method of claim 1 wherein the step of using the inventory lists from the members of the cluster to generate a compliance report that indicates which members have a component that has an update comprises:

using the inventory lists from the members of the cluster to generate a consolidated list of components of the cluster, including identifying components shared by two or more members of the cluster; and using the consolidated list for the cluster and an update catalog to generate the compliance report.

7. The computer-implemented method of claim 6 further comprising:

responsive to the datacenter comprising a plurality of clusters and each cluster comprises a cluster leader, sharing the consolidated list of components for the cluster with other cluster leaders to identify whether one or more components are common across clusters; and responsive to one or more components being in common across two or more clusters, designating, or participating in designating, the designated information handling system to access and download to the local datastore the update on behalf of the members of the two or more clusters that have the component that has not yet applied the update.

8. The computer-implemented method of claim 1 wherein the inventory list is a hash list format.

9. The computer-implemented method of claim 1 further comprising:

receiving from at least one of the members of the cluster an updated inventory list; and using the updated inventory list or lists to generate a compliance report.

10. An information handling system at a datacenter, the information handling system comprising:

one or more processors; and a non-transitory computer-readable medium or media comprising one or more sets of instructions which, when executed by at least one of the one or more processors, causes steps to be performed comprising:

receiving broadcasted data from one or more other information handling systems at the datacenter that comprises one or more details about the one or more other information handling systems, one or more identifiers about the one or more other information handling systems, or both, in which at least some of the broadcasted data is used to cluster information handling systems by identifying information handling systems that share one or more similarities related to one or more updates;

joining a cluster as a member of the cluster, in which membership of the cluster is determined using at least some of the broadcasted data in which members of the cluster share one or more similarities, wherein the cluster is formed based on the broadcasted data without a pre-existing cluster leader or external management controller initiating formation of the cluster, and wherein the cluster comprises the information handling system as a member and at least one other information handling system at the datacenter as a member; and responsive to being designated a cluster leader for the cluster of which it is a member, wherein the information handling system is designated as the cluster leader after the cluster is formed and from among the members of the cluster:

receiving from each of the members of the cluster an inventory list that comprises components of the member that are subject to being updated;

using the inventory lists from the members of the cluster to generate a compliance report that indicates which members have a component that has an update; and providing, or causing to be provided, a location of a downloaded update at a local datastore to the members of the cluster that have the component that has not yet applied the update, in which the update is downloaded to the local datastore by a designated information handling system at the datacenter to access and download the update on behalf of at least the members of the cluster that have the component that has not yet applied the update.

11. The information handling system of claim 10 wherein the non-transitory computer-readable medium or media further comprises one or more sequences of instructions which, when executed by at least one of the one or more processors, causes steps to be performed comprising:

designating the designated information handling system to access and download to the local datastore the update on behalf of at least the members of the cluster that have the component that has not yet applied the update.

12. The information handling system of claim 11 wherein the designated information handling system is the information handling system or a member of the cluster.

13. The information handling system of claim 10 wherein the non-transitory computer-readable medium or media further comprises one or more sequences of instructions which, when executed by at least one of the one or more processors, causes steps to be performed comprising:

responsive to the cluster not being in a mesh network topology, causing the designated information handling system to store the update in the local datastore that is a shared location, which is accessible by at least the members of the cluster that have the component that has not yet applied the update; and responsive to the cluster being in a mesh network topology, causing the designated information handling system to store the update in the local datastore that is a memory location on a member of the cluster.

14. The information handling system of claim 10 wherein the non-transitory computer-readable medium or media further comprises one or more sequences of instructions which, when executed by at least one of the one or more processors, causes steps to be performed comprising:

broadcasting to one or more other information handling systems at the datacenter, data about the information handling system comprising one or more details, one or more identifiers, or both about the information handling system, in which at least some of the data is used to help form the cluster by identifying one or more other information handling systems that share one or more similarities related to updating.

15. The information handling system of claim 10 wherein the step of using the inventory lists from the members of the cluster to generate a compliance report that indicates which members have a component that has an update comprises:

using the inventory lists from the members of the cluster to generate a consolidated list of components of the cluster, including identifying components shared by two or more members of the cluster; and using the consolidated list for the cluster and an update catalog to generate the compliance report.

16. The information handling system of claim 10 wherein the non-transitory computer-readable medium or media further comprises one or more sequences of instructions which, when executed by at least one of the one or more processors, causes steps to be performed comprising:

sharing the consolidated list of components for the cluster with one or more other cluster leaders at the datacenter to identify whether one or more components are common across clusters; and responsive to one or more components being in common across two or more clusters, designating, or allowing to be designated, the designated information handling system to access and download to the local datastore the update on behalf of the members of the two or more clusters that have the component that has not yet applied the update.

17. The information handling system of claim 16 wherein the designated information handling system is a member of a different cluster than the information handling system.

18. A non-transitory computer-readable medium or media comprising one or more sequences of instructions which, when executed by at least one processor, causes steps to be performed comprising:

receiving, at a first information handling system of a datacenter, broadcasted data from one or more other information handling systems at the datacenter that comprises one or more details about the one or more other information handling systems, one or more identifiers about the one or more other information handling systems, or both, in which at least some of the broadcasted data is used to cluster information handling systems by identifying information handling systems that share one or more similarities related to one or more updates;

joining a cluster as a member of the cluster, in which membership of the cluster is determined using at least some of the broadcasted data in which members of the cluster share one or more similarities, wherein the cluster is formed based on the broadcasted data without a pre-existing cluster leader or external management controller initiating formation of the cluster, and wherein the cluster comprises the first information handling system as a member and at least one other information handling system at the datacenter as a member; and responsive to the first information handling system being designated a cluster leader for the cluster of which it is a member, wherein the first information handling system is designated as the cluster leader after the cluster is formed and from among the members of the cluster:

receiving from each of the members of the cluster an inventory list that comprises components of the member that are subject to being updated;

using the inventory lists from the members of the cluster to generate a compliance report that indicates which members have a component that has an update;

designating, or participating in designating, an information handling system to access and download to a local datastore the update on behalf of members of the cluster that have the component that has not yet applied the update; and providing, or causing to be provided, a location of the downloaded update at the local datastore to the members of the cluster that have the component that has not yet applied the update.

19. The non-transitory computer-readable medium or media of claim 18 wherein the step of using the inventory lists from the members of the cluster to generate a compliance report that indicates which members have a component that has an update comprises:

using the inventory lists from the members of the cluster to generate a consolidated list of components of the cluster, including identifying components shared by two or more members of the cluster; and using the consolidated list for the cluster and an update catalog to generate the compliance report.

20. The non-transitory computer-readable medium or media of claim 18 further comprising one or more sequences of instructions which, when executed by at least one processor, causes steps to be performed comprising:

sharing the consolidated list of components for the cluster with one or more other cluster leaders at the datacenter to identify whether one or more components are common across clusters; and responsive to one or more components being in common across two or more clusters, designating, or allowing to be designated, the designated information handling system to access and download to the local datastore the update on behalf of the members of the two or more clusters that have the component that has not yet applied the update.

* * * * *